Jan. 14, 1930. D. H. DAVIS ET AL 1,743,436
TRAILER FRAME STRUCTURE
Filed May 25, 1927
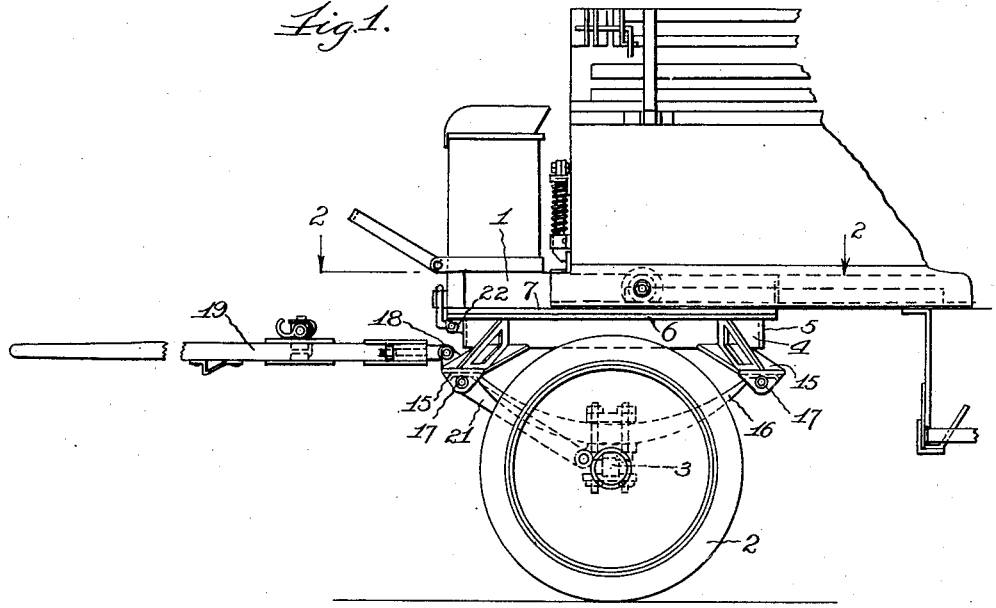
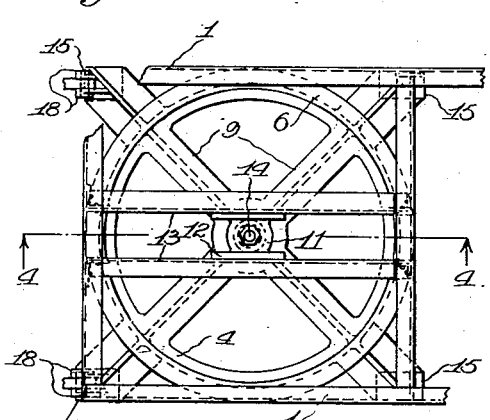
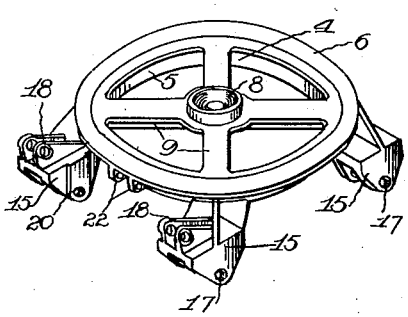
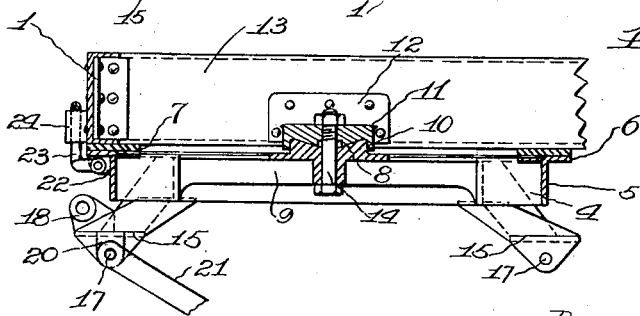
Inventors.
Durrel H Davis &
Leroy E. Williams.
by
their Attorneys.
Witness Patented Jan. 14, 1930

1,743,436

UNITED STATES PATENT OFFICE

DURREL H. DAVIS AND LEROY E. WILLIAMS, OF EDGERTON, WISCONSIN, ASSIGNORS TO HIGHWAY TRAILER COMPANY, OF EDGERTON, WISCONSIN, A CORPORATION OF WISCONSIN

TRAILER-FRAME STRUCTURE

Application filed May 25, 1927. Serial No. 193,976.

This invention relates to vehicles and more particularly to the swivel truck, and has for its object to provide an improved swivel truck construction including a unitary cast member forming the entire sub-frame structure and incorporating the various fixtures. It consists in certain features and elements of construction in combination as herein shown and described and as indicated by the claims.

In the drawing:

Figure 1 is a side elevation of the front end of a vehicle, embodying our improved construction.

Figure 2 is a transverse horizontal section taken on line 2—2 Figure 1.

Figure 3 is a perspective view of the unitary cast member of the swivel truck; and Figure 4 is a longitudinal section through the truck taken on line 4—4 Figure 2.

With reference to the drawing, the main frame of the vehicle is indicated at 1, having a truck swivelly connected thereto, and mounted on the usual supporting wheels, 2, and axle, 3. The swivel truck includes a unitary cast member, 4, forming the entire sub-frame structure, said cast member comprising a substantially vertical web or side portion, 5, with an annular bearing ring, 6, in a plane at right angles thereto at the upper edge, adapted to have sliding engagement with a corresponding ring member, 7, secured to the underside of the main frame, 1, to form a fifth wheel for steering the vehicle. The unitary cast member has also integrally connected therewith, an upstanding circular guide portion, 8, concentric with the ring, 6, and integrally connected thereto by diagonally extending reinforcing arms, 9. These arms, are provided with a horizontal bar having a rib depending from the under side, centrally thereof, forming a T section. The outer periphery of the circular portion, 8, has slidable bearing engagement in a circular recess, 10, formed in the bottom of a corresponding guide member, 11, provided with upwardly extending arms, 12, attached to the inner sides of a pair of longitudinally spaced supporting members, 13, of the main frame, 1. The unitary cast member of the truck, is attached to the guide member, 11, of the main frame, 1, by a king bolt, 14. This construction permits the guide portion, 8, to be concentric with king bolt, thereby serving as a bearing pivot about which the truck may pivot during steering movement. Further, the circular guide member relieves the king bolt, 14, of all lateral strain; and also tends to distribute over a larger area the shocks and thrusts due to sudden starting and stopping.

In alignment with the diagonal arms, 9, at both front and rear ends, the unitary cast member is provided with integral brackets, 15, extending laterally and downwardly for housing the ends of a pair of spaced longitudinally extending springs, 16, which are perched at the middle on the axle, 3, in a usual manner. These brackets are fitted with the usual pin and roller members, 17, adapted to provide for longitudinal movement of the ends of said springs when in operation. Upstanding lugs, 18, are integrally formed on the upper side of the forward brackets, serving as sockets for pivotally supporting the laterally spaced terminals of a draft member. The draft member for the vehicle may be of a type to suit convenience, such as a draw bar, when the vehicle is used as a trailer or as shafts, 19, herein shown, adapted when the vehicle is to be horse-drawn. The inner sides of the forward brackets, 15, are provided with bosses, 20, concentric with the pin and roller members, 17, adapted to support thereagainst, the upper ends of a pair of radius rods, 21, having their opposite ends connected to the axle, 3, inwardly of the springs.

It will be understood that unitary cast members may be suitably employed for sub-frame structure in vehicles of the trailer type, having both ends arranged for steering movement. Vehicles capable of double steer, should have the rear truck fixed in locked position, and for this purpose, a pair of laterally projecting lugs, 22, extend from the front end of the web portion, 5; central with respect to the brackets, 15. Said lugs, 22, pivotally support a locking bar, 23, adapted to be swung upwardly in position to engage a lug, 24, projecting laterally from the forward end of the main frame, 1.

The unitary cast member serving as subframe structure in vehicles, as herein described, insures economical fabrication and materially reduces the time required in assembly. Further, the arrangement provides a compact, rigid, durable construction of maximum strength to the necessary parts together with minimum weight.

We claim:

1. In a vehicle, the combination of a main frame, a truck swivelly connected thereto, including a unitary cast member forming the entire subframe comprising substantially vertical side portions, with an integral ring engaging the main frame to form a turntable for steering movement, and integral brackets extending laterally at both ends, springs disposed outside said side portions having their ends mounted on said brackets, lugs extended from the front face of said side portion, central with respect to said front brackets, adapted to carry a locking member engageable with said main frame for locking the truck against steering movement.

2. In a vehicle, the combination of a main frame, a truck swivelly connected thereto, including a unitary cast member forming the entire sub-frame, the upper portion of said sub-frame being provided with a bearing ring engageable with the main frame as a fifth wheel, guide means including an integral part formed on the upper side of said unitary cast member, and a cooperating part on the main frame to provide lateral guidance to the truck in steering movement and a king bolt for securing said parts together against vertical separation.

3. In the combination defined in claim 2, said guide means including an upstanding circular portion, and a cooperating guide member carried on the main frame engaging the outer periphery of said portion whereby to maintain said truck in steering alignment.

4. In the combination defined in claim 2, said guide means including an upwardly extending circular part concentric with the swivel connection, and a guide member mounted on the main frame centrally above said part having a recess therein with an inner periphery engaging the outer periphery of the circular part whereby to transmit the pull exerted at the swivel conection when the vehicle is drawn.

5. In a vehicle, the combination of a main frame, a truck pivotally attached thereto, said truck including a unitary cast member forming the entire sub-frame, comprising an annular ring on the upper side, engageable with the main frame as a turntable, brackets extending laterally from the ends of the cast member adapted to mount the ends of a pair of springs connected to an axle for supporting the truck, a circular guide extending upwardly from the casting concentric with the annular ring, a cooperating guide member on the main frame engageable therewith for guiding the truck in steering movement, a king bolt for securing said guide members against vertical separation, and lugs extending laterally from the forward end of the unitary cast member carrying a locking member engageable with the main frame for locking the truck against steering movement.

6. In the combination defined in claim 5, said brackets on the forward end of the unitary cast member being provided with a pair of sockets adapted to engage the terminals of a draw bar for pulling the vehicle; the inner sides of said forward brackets being arranged to support a connection to a radius rod which extends to the axle for transmitting the pull on the unitary cast members, to said axle.

7. In the combination defined in claim 2, said guide means being a circular part centrally disposed within the bearing ring, and the casting including brackets disposed in pairs at the front and rear to engage the ends of the vehicle springs together with diagonals extending from said central guide to the brackets respectively.

8. In a vehicle, the combination of a main frame, a truck swivelly connected thereto, including a unitary cast member forming the entire sub-frame, the upper portion of the sub-frame being provided with a bearing ring engageable with the main frame as a fifth wheel, means providing lateral guidance to the truck in steering movement, comprising a part integrally formed with the upper side of the unitary sub-frame, and a cooperating part carried by the main frame, one of the parts of said guide means being provided with a chamber, the other part having an annular ring telescopically associated in said chamber and rotatable relative to each other, and means for securing said parts against vertical separation.

9. In a vehicle the combination of a main frame, a truck swivelly connected thereto, including a unitary cast member forming the entire sub-frame comprising a vertically disposed web portion with an integral horizontally disposed annular ring conected thereto to form a T section, the ring being adapted to slidably engage the main frame for steering movement, an upwardly extending annular flange integrally connected to the ring by diagonally extending braces, and a downwardly depending annular flange carried by the main frame and adapted to engage the outer wall of said upwardly extending flange for providing lateral guidance to the truck in steering movement.

DURREL H. DAVIS.
LEROY E. WILLIAMS.